April 15, 1952  E. G. REED, JR  2,593,184
TRANSMISSION

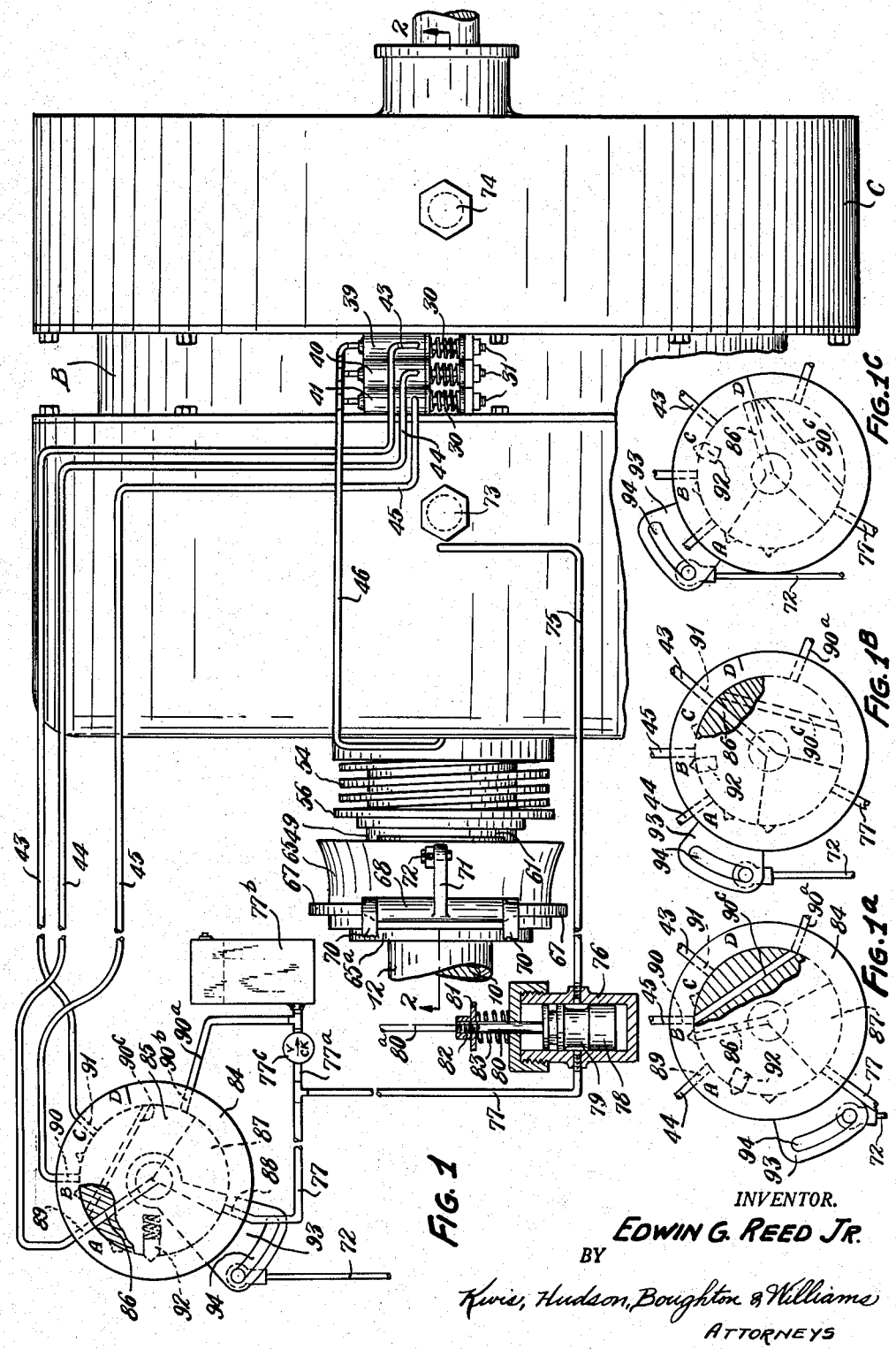

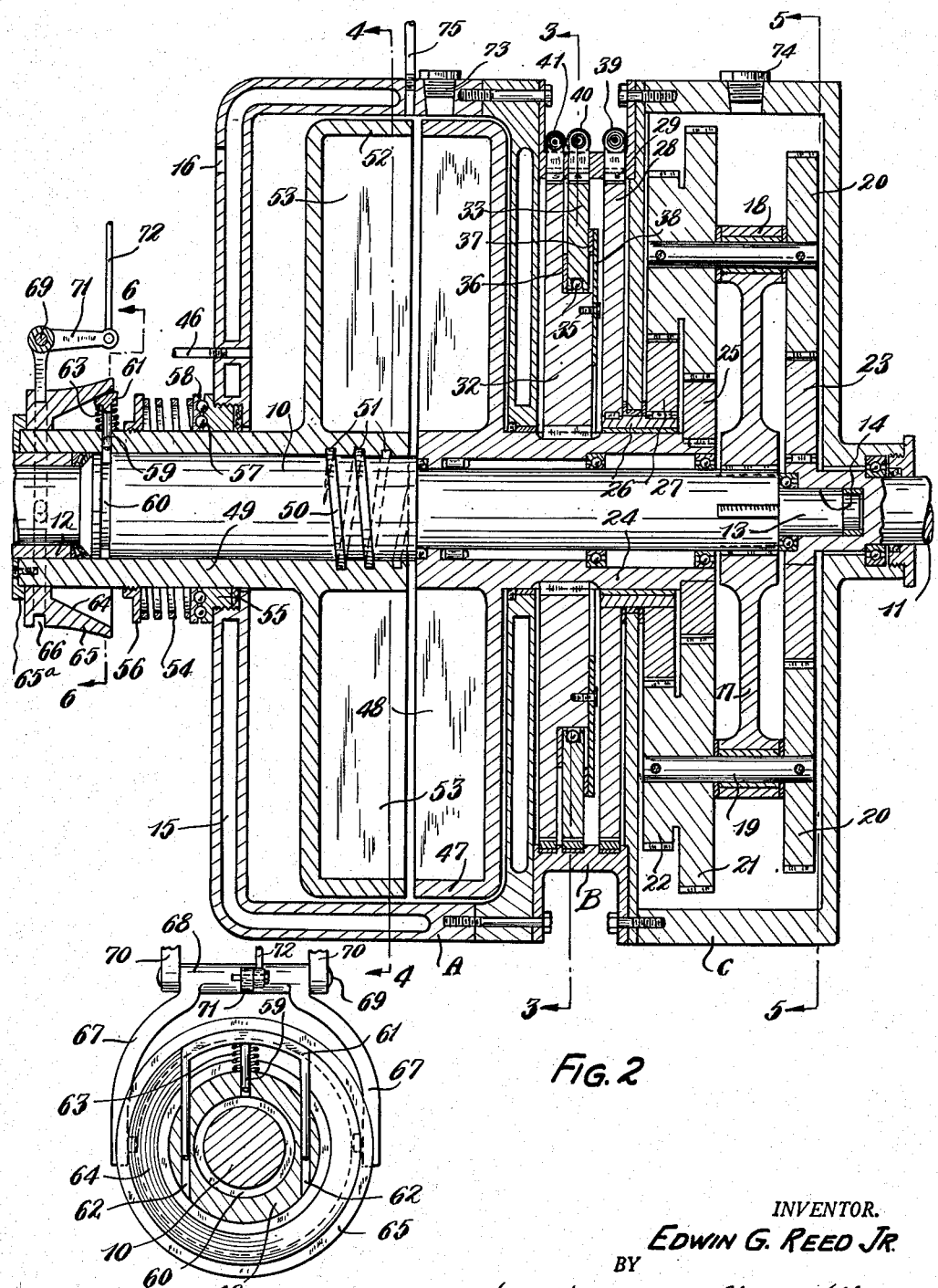

Filed Dec. 12, 1947  3 Sheets-Sheet 3

INVENTOR.
EDWIN G. REED JR.
BY
Kwis, Hudson, Boughton & Williams
ATTORNEYS

Patented Apr. 15, 1952

2,593,184

UNITED STATES PATENT OFFICE 2,593,184

TRANSMISSION

Edwin G. Reed, Jr., Bethesda, Md.

Application December 12, 1947, Serial No. 791,278

14 Claims. (Cl. 74—688)

This invention relates to a transmission and particularly to a transmission combining a fluid drive unit and a mechanical power transmitting unit, i. e. a gear unit.

The transmission embodying the invention may be advantageously used to operatively interconnect the driving and driven shafts of various forms of power driven apparatus, but inasmuch as the transmission has special utility when used in motor vehicles to connect the engine shaft with the driven or propeller shaft it will be described herein by way of illustration and without limitation as employed in such environment.

Heretofore change speed transmissions for connecting the driving and driven shafts of power actuated mechanisms quite generally have consisted of shiftable change speed gears and have required the use of a clutch between the driving shaft and the transmission or the use of other mechanism permitting the shifting of the gears to obtain the various speeds.

In the generally used transmissions the manual shifting of the gears does not facilitate the operation and control of the transmission while those transmissions wherein the gears are shifted automatically are usually expensive and complex.

In addition to the usual forms of transmission heretofore employed, transmissions have been designed and used embodying a combination of clutches, fluid drive units, change speed gear transmissions or planetary gear transmissions of fixed gear ratios. These additional forms of transmissions have the disadvantages of requiring the use of manually operated clutches, of not providing a fixed torque ratio during acceleration and heavy torque loads, of not decreasing the torque ratio automatically to substantially direct drive when the torque of the engine approaches the torque load, and of not providing a fixed torque ratio for reverse drive.

An object of the invention is to provide an improved and novel transmission embodying a fluid drive unit and a mechanical power transmitting unit and without necessitating the use of manually operated clutches and which transmission eliminates the disadvantages of the transmissions heretofore used or designed and referred to above.

A further object of the invention is to provide a transmission of the type referred to and which furnishes smooth and rapid acceleration at various desired gear ratios without necessitating manual or automatic gear shifting or the use of clutches or a complicated control system.

A further object is to provide a transmission as specified in the last named object and which is capable of producing a positive low speed drive and a positive reverse drive.

A still further object is to provide a transmission embodying a fluid drive unit and a mechanical power transmitting unit and in which latter unit the gears thereof are always intermeshed, thus obviating the use of a manually or automatically operated clutch.

A still further and important object of the invention is to provide a transmission of the type specified wherein there is a fixed torque ratio during acceleration of the power source and under heavy torque load conditions but which fixed torque ratio decreases automatically to substantially direct drive when the torque of the power source approaches torque load.

A still further object is to provide a transmission as referred to in the last object and wherein a fixed torque ratio exists for reverse drive and the use of manually or automatically operated clutches is eliminated.

A more specific object of the invention is to provide a transmission combining a gear train such as an epicyclic gear train and a fluid fan unit to produce the desired and required varying speeds and torque ratios.

Another object of the invention is to provide a transmission combining the use of a fluid fan unit and a gear train unit thus dividing or distributing power source torque between the fans of the fan unit and the gear shafts and thereby enabling smaller fans to be used and also reducing stress and wear in the shafts, gears, bearings and other operative parts of the transmission, thus increasing the efficiency of the transmission and prolonging its useful life.

A still further object of the invention is to provide an improved and novel transmission embodying a fluid drive unit and a mechanical power transmitting unit and wherein the impeller or driving fan and the driven fan of the fluid drive unit are relatively and automatically movable in an axial direction during operation of the transmission to vary the fluid torque transmitted between the fans in accordance with varying requirements of operation.

A still further object is to provide an improved and novel transmission combining a fluid drive unit and a gear drive unit and wherein positive gear ratios can be obtained, and more specifically wherein these positive gear ratios are obtained by the use of a free wheeling device included in the transmission.

A further and important object is to provide an improved and novel transmission which includes a fluid drive unit and which transmission can be conditioned when the power source is inactive, as when a motor vehicle equipped therewith is parked, to lock the propeller or driven shaft against rotation similarly to leaving in gear the usual change speed gear transmission.

Further and additional objects and advantages not hereinbefore specified will become apparent during the detailed description of an embodiment of the invention which is to follow. Referring to the accompanying drawings illustrating such embodiment of the invention, Fig. 1 is an elevational view of a transmission embodying the invention and illustrates schematically and partly in section the selector valve, the main "off" and "on" valve and the fluid circuits for the transmission, the selector valve being shown in the position it occupies for forward automatic drive.

Fig. 1a is a detached view of the selector valve shown in position for forward positive low gear operation of the transmission, the section portion being taken through a different plane of valve body or core than is the sectional portion shown in Fig. 1.

Fig. 1b is a detached view of the selector valve shown in position for reverse operation of the transmission, the sectional portion of the valve body or core being taken through the same plane as the sectional portion of Fig. 1.

Fig. 1c is a detached view of the selector valve shown in neutral or inactive position.

Figure 5:
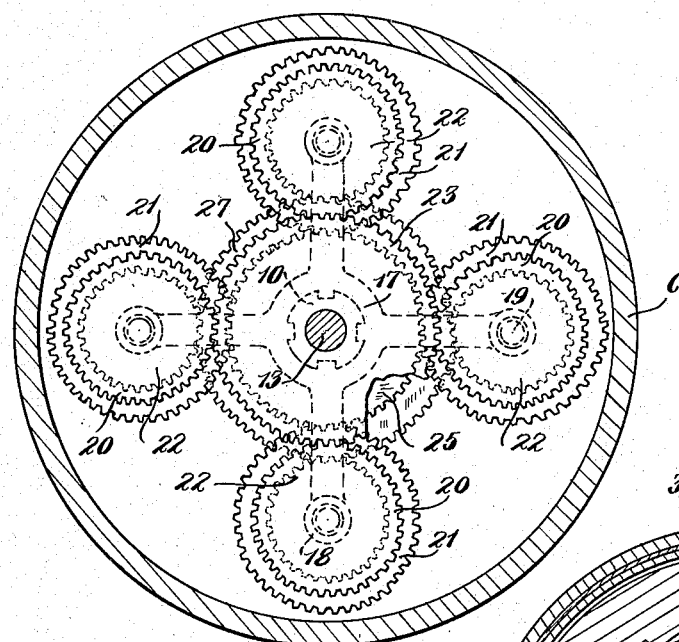
Figure 3:
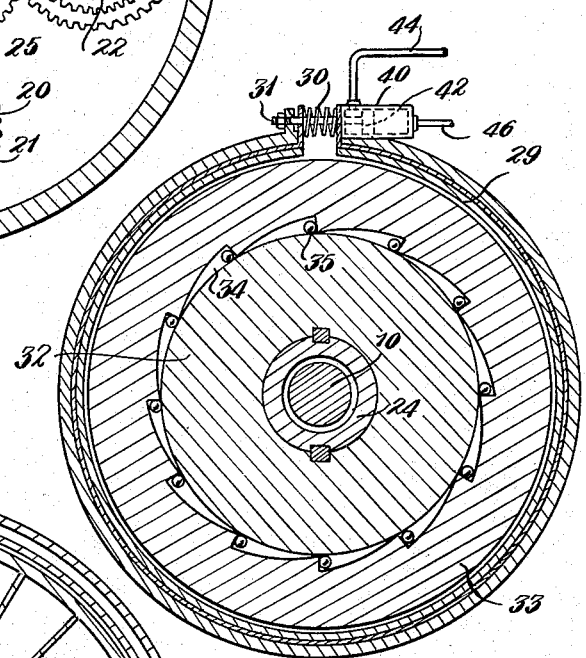
Figure 4:
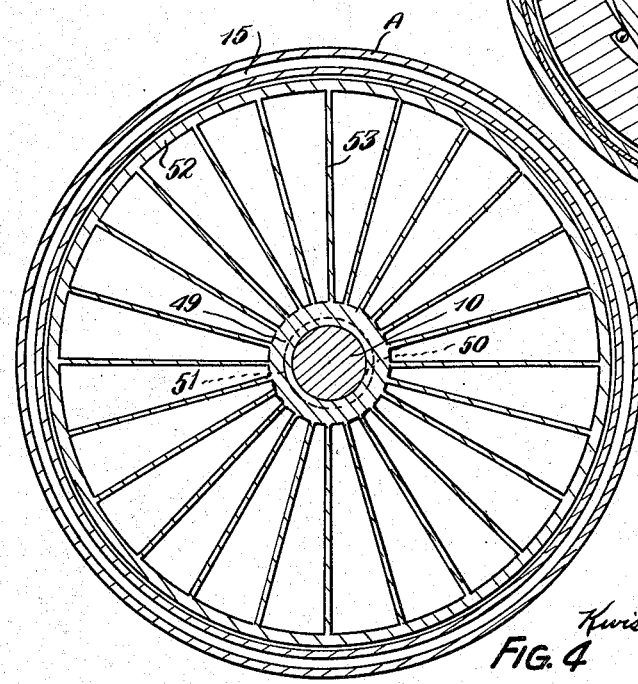

Fig. 2 is a longitudinal sectional view through the transmission and is taken substantially on line 2—2 of Fig. 1 looking in the direction of the arrows, and Figs. 3, 4, 5 and 6 are transverse sectional views taken, respectively, approximately on lines 3—3, 4—4, 5—5 and 6—6 of Fig. 2 looking in the direction of the arrows.

As previously stated the transmission embodying the invention may be employed advantageously in connecting the driving and driven shafts of many various forms of power driven apparatus. Since the transmission has particular utility when employed in a motor vehicle to interconnect the engine shaft and the driven or propeller shaft it will be so explained herein not by way of limitation but merely for purposes of illustrations.

In view of the broad utility of which the transmission is susceptible it has been shown in the drawings as designed for more general use than as a transmission for a motor vehicle and for that reason the driving or power shaft 10 when viewed from the left of Figs. 1 and 2 rotates counterclockwise.

Bearing the above in mind it may be assumed, however, that the driving or power shaft 10 which extends from the power source is, in this instance, the engine shaft of the internal combustion engine of a motor vehicle, even though in most motor vehicles such engine shaft rotates clockwise when looking from the front of the vehicle toward the rear thereof. The driven shaft 11 which is operatively connected to the driving shaft 10 by the transmission embodying the invention may be the propeller shaft of the motor vehicle and it extends to the usual differential mechanism found in vehicles of this type. The driving or engine shaft 10 is rotatably supported in a supporting bushing 12 forming part of the engine or engine frame and suitable anti-friction and thrust bearings are provided for said engine shaft as will be well understood in the art. The end of the engine shaft within the transmission is provided with a centrally reduced portion 13 that rotatably interfits a bore 14 formed in the adjacent end of the driven or propeller shaft 11, suitable anti-friction and thrust bearings and spacer sleeves being provided between the shafts. This arrangement maintains the shafts in axial alignment.

The transmission is contained in a housing illustrated as consisting of a casing A for the fluid drive unit, an intermediate casing B for the brake mechanism of the transmission and a casing C for the mechanical power transmitting or gear unit of the transmission. If desired, the casings B and C might be combined into a single casing. The aligned driving and driven shafts 10 and 11 extend centrally into and through the housing, it being understood that suitable seals are provided between said shafts or other parts of the transmission and the three casings A, B and C forming the housing to prevent the leakage of fluid or liquid from the casings. The casing A of the fluid drive unit is provided with a coolant jacket 15 and said jacket may have coolant introduced into the same from a suitable source of supply connected to the opening 16. It will be understood that the coolant may be circulated through the jacket and a suitable outlet opening therefor (not shown) may be provided. The driving shaft 10 within the casing C has fixedly keyed to it a carrier or cross head 17 which is shown as formed with four radially extending arms spaced apart 90°, although it will be understood that said cross head or carrier might be provided with a different number of arms. The outer ends of the arms of the carrier 17 are provided with enlarged or extended bearing sleeve portions 18 which rotatably mount gear supporting shafts 19 of the planetary gear unit contained in the casing C.

The shafts 19 are parallel with each other and with the shafts 10 and 11 and have fixed to their right hand ends as viewed in Fig. 2, gears 20 while the opposite ends of said shafts have fixed thereto gear clusters formed of a larger gear 21 and a smaller gear 22. The gears 20 and 21 maintain the shafts 19 against axial movement in the bushing sleeves 18 of the carrier 17. The gears 20 constantly mesh with a large sun gear 23 keyed to the driven or propeller shaft 11, whereby said gears 20 can drive the gear 23 and the shaft 11 with a suitable and desired gear reduction drive.

An elongated sleeve 24 extends from the casing A through casing B and into casing C and is freely rotatable on the driving shaft 10 but is held against axial displacement relative to said shaft as clearly indicated in Fig. 2. The end of the sleeve 24 within the casing C has keyed to it a sun gear 25 which constantly meshes with the gears 21 of the gear clusters fixed to the shafts 19 that are rotatably mounted in the arms of the carrier 17. Although the gears 21 and 25 are shown as of the same size it will be understood that the size of said gears might be in a different ratio as desired in the provision of varying functions for the transmission.

A sleeve 26 is rotatable freely on the sleeve 24 but is held against axial movement thereon and extends from within the casing C to within the casing B. The sleeve 26 within the casing C has fixed to it a sun gear 27 which constantly meshes with the gears 22 of the gear clusters fixed on the shafts 19 mounted in the carrier. The gear 27 is shown as larger than the gears 22, the ratio indicated being approximately two-to-one, but it will be understood that this ratio might be varied as desired. The sleeve 26 within the casing B has keyed to it a brake disk or wheel 28, the periphery of which forms a brake drum located within the brake band 29 of a brake mechanism of the well known contractible type and which brake mechanism is clearly shown in Fig. 3. The casing B mounts three such brake mechanisms, one of which is associated with the disk or wheel 28 and the other two of which are associated with parts shortly to be described. Inasmuch as the three brake mechanisms are identical in construction a single description thereof should suffice for all three mechanisms and in so describing the brake mechanism reference is made to Fig. 3, even though the brake mechanism shown therein cooperates with a part not yet described.

The brake mechanism of the contractible type is held normally expanded or released by a spring 30 located between outwardly extending lugs formed on the contractible brake band and through which lugs extends a rod 31 which when moved in one direction contracts the brake band against the action of the spring 30 to apply the brake and when moved in the opposite direction by the spring releases the brake.

The sleeve 24 has keyed to it a stepped brake wheel 32. The step of the brake wheel 32 mounts a free wheeling device in the form of a brake annulus 33, the inner circumference of which surrounds the step of the brake wheel 32 and which annulus is provided with a continuous circumferentially extending series of recesses 34 which diminish in depth in a counterclockwise direction as viewed in Fig. 3 and in which recesses are located balls 35. It will be seen than when the annulus 33 is held against rotation the stepped brake wheel 32 may rotate relative to the annulus in a clockwise direction as viewed in Fig. 3 but not in a counterclockwise direction, since in the latter instance the balls 35 will interlock the wheel 32 and the annulus 33 as soon as the balls reach a position in the recesses 34 of limited depth as is well known in constructions of this type.

The outer circumference of the annulus 33 is within the brake band 29 of the intermediate brake mechanism while the outer circumference of the brake wheel 32 is within the brake band of the left hand brake mechanism as viewed in Fig. 2. The annulus 33 is maintained against axial displacement by a spacer ring 36 located between it and the stepped brake wheel 32 and by a spacer ring 37 engaging the right hand side of the annulus as viewed in Fig. 2 and carried by a ring-like plate 38 secured to the right hand side of the brake wheel 32.

Reading from right to left in Fig. 2 the brake mechanisms for the brake disk or wheel 28, the brake annulus 33 and the brake wheel 32 are actuated, respectively, to braking or engaged position against the action of the springs 30 by fluid pressure devices consisting of cylinders 39, 40 and 41, respectively, also see Fig. 1. The rods 31 of the brake mechanisms extend into said cylinders and therein are provided with pistons 42 which are moved in a brake applying direction by fluid pressure entering the cylinders 39, 40 and 41, respectively, through inlet conduits 43, 44 and 45. Said cylinders 39, 40 and 41 are connected to a drain conduit 46 which communicates with the central portion of the casing A. The inlet and drain conduits for said cylinders will be referred to hereinafter as will also the means for controlling the actuation thereof to apply and release the respective brake mechanisms.

The portion of the sleeve 24 which extends into the casing A carries the driven fan 47 of the fluid drive unit and said fan may be formed integral with the seleve 24 or be separate therefrom and rigidly secured thereto as may be desired. The fan 47 is of general cup-shape configuration and is provided with a plurality of radial blades 48. As already stated, the sleeve 24 is mounted against axial movement and hence the fan 47 while having rotative movement in the casing A does not have any axial movement therein.

An elongated sleeve 49 extends from within the casing A outwardly thereof toward the engine and is slidably supported on the driving or engine shaft 10 and on the sleeve 12. The driving shaft 10 is provided with spiral threads 50 that cooperate with spiral grooves or threads 51 formed in the sleeve 49 and said cooperating threads produce or permit relative axial movement of the sleeve 49 on the shaft 10 and also function to operatively interconnect the sleeve 49 and driving shaft for rotation together. The sleeve 49 within the casing A carries a driving or impeller fan 52 similar to the fan 47 and provided with a circularly spaced series of radially extending blades 53. The open ends of the cup-shaped impeller or driving fan 52 and of the driven fan 47 face toward each other and are spaced apart predetermined distances which, as will later be explained, is variable to meet different operating conditions, it having been noted that the fan 52 is capable of axial movement relative to the fan 47 and the driving shaft 10.

In place of the cup-shaped or drum-like fans illustrated the driving and driven fans of the fluid drive unit may be constructed in the form of torus rings to prevent fluid friction between the fans and the casing.

A coil spring 54 surrounds the sleeve 49 externally of the casing A and has its opposite ends abutting the packing gland nut 55 carried by the casing and a stop ring 56 threadedly connected to the sleeve 49. If desired, anti-friction balls 57 may be interposed between the packing gland nut 55 and a disk 58 against which the end of the spring 54 abuts. The spring 54 constantly tends to move the sleeve 49 and fan 52 axially toward the left as viewed in Fig. 2 to increase the gap between the impeller fan 52 and the driven fan 47 and thereby to minimize fluid torque between the fans, it being recalled that in the illustrated construction the driving shaft 10 is assumed to be rotating in a counterclockwise direction when viewed from the left of Figs. 1 and 2. This is the condition that prevails when the power source or engine is idling and it is advantageous during such time to lock the sleeve 49 and fan 52 in this axially displaced position. This is accomplished by means of a pin 59 slidably passing through an opening in the sleeve 49 and engageable in an annular groove 60 formed in the shaft 10. The pin 59 is formed on a U-shaped member 61, the parallel legs of which slide in parallel chordal openings 62 formed in the sleeve 49, see Fig. 6 wherefore the U-shaped member and the pin 59 are accurately guided and maintained in the proper position. A spring 63 surrounds the pin 59 and abuts against the sleeve 49 and the underside of the base of the U-shaped member 61 and functions to normally maintain the pin in retracted or inoperative position wherein it is withdrawn from the groove 60. The upper surface of the base of the U-shaped member 61 is an inclined or camming surface which cooperates with the internal conical surface 64 of an actuating collar 65 that is slidable on the sleeve 49. The collar 65 is provided on its periphery with an annular groove 66 into which extend shoes carried by the free ends of yoke arms 67 that straddle the collar. The yoke arms 67 are shown as formed integral with a sleeve 68 that is rockably mounted on a pin 69 supported in brackets 70 which may be part of the engine frame. The sleeve 68 intermediate the yoke arms 67 is provided with an outwardly extending arm 71 to which an actuating link 72 is pivotally connected. During the forward automatic drive and the positive low gear operation of the transmission the pin 59 is retracted as indicated in Fig. 2 and the relationship of the collar 65 to the U-shaped member 61 is as shown in said view. The link or rod 72 is operatively connected to the selector valve, later to be described, in such manner that when the valve is set for forward automatic drive through the transmission or for positive low gear operation of the transmission the collar 65 will be in the position shown in Fig. 2 and the pin 59 will be retracted, but when said valve is set for reverse drive through the transmission or in neutral or idling position then the collar will have been moved toward the transmission housing relative to the U-shaped member 61 to compress the spring 63 and cause the pin 59 to be inserted in the groove 60, since during these two conditions it is advantageous that the sleeve 49 and fan 52 be held against relative axial movement with respect to the shaft 10. The relative movement of the collar 65 on the sleeve 49 in a direction away from the transmission housing is limited by a stop plate 65a secured to the end of sleeve 49.

The casing A of the housing is provided with a filler plug 73 to enable the casing to be filled with a suitable liquid which has slight viscosity changes over a wide range of temperature changes as will be well understood in the art. The casing C has a filler plug 74 to enable the casing containing the planetary gearing to be filled with a suitable lubricating oil, preferably a heavy lubricating oil. It will be understood that the casing B also is provided with means such as a filler plug to enable it to be filled with a lighter lubricating oil acting on the brake wheels and free wheeling mechanism. The housing formed of the casings A, B and C may be connected to the engine frame or base or to the frame of the vehicle, or to any other suitable support, depending upon a particular installation, it being understood that the housing is always mounted so as to be rigidly stationary.

A fluid pressure conduit 75 communicates with the interior of the casing A adjacent the outer circumferences of the driving and driven fans 52 and 47. This conduit 75 extends to and communicates with the intermediate portion of a valve housing 76 forming part of the main "on" and "off" valve of the apparatus. An outlet conduit 77 also communicates with the valve housing 76 and is in diametrically aligned relationship with the conduit 75. A valve body or core 78 is slidable in the housing 76 and is provided with a wide annular groove 79 which during the forward automatic drive, the positive low gear operation and the reverse drive of the transmission is in communication with the conduits 75 and 77. The width of the groove 79 is such that it will communicate with the conduits 75 and 77 whenever the engine is being accelerated. The valve body 78 is provided with a suitable packing or seal adjacent its upper end as viewed in Fig. 1 and also has a valve rod 80 extending outwardly of the casing and provided with an abutment plate 81 engaging a nut 82 screwed on the rod. A spring 83 surrounds the rod and abuts the valve housing 76 and the abutment plate 81 and functions to normally maintain the valve body in a position wherein the annular groove 79 is not aligned with the conduits 75 and 77, at which time said conduit 75 is dead-ended against the circumference of the valve body.

The valve rod 80 has a reduced portion 80a which is operatively connected to the accelerator pedal or control such that when the engine is idling and said pedal or control is not depressed the valve body 78 will be maintained by the spring 83 in its "off" position. However, as soon as the accelerator pedal or control is moved to accelerate the engine the valve body 78 is moved against the action of the spring 83 to bring the groove 79 of the body in alignment with the conduits 75 and 77.

The conduit 77 extends to and communicates with the interior of the housing 84 of a selector valve. This valve may be suitably located and supported within convenient reach of the operator. The selector valve has rockably mounted in its housing 84 a valve body or core 85, it being understood that said body is rocked to its various positions by means of a control lever not shown. The valve body 85 is provided with a radial passage 86 extending to the periphery of the valve body and communicating at its inner end with a sector-like recess 87 of such arcuate extent as to register, except when the valve body is in neutral or idle position, with a port 88 in the valve housing and with which the conduit 77 communicates. The passage 86 can be selectively registered with ports 89 and 91 formed in the valve housing (see Figs. 1 and 1b) and with which the conduits 44 and 43, respectively, communicate, it being recalled that said conduits at their other ends communicate respectively with the cylinders 49 and 39 of the brake mechanisms. Hence the selector valve can be operated to selectively connect the conduit 77 with these two brake mechanisms, such selected positions of the selector valve being indicated in Figs. 1 and 1b as positions A and C.

The conduit 77 has connected to it intermediate the main "off" and "on" valve and the selector valve a branch conduit 77a. This branch conduit 77a communicates with an accumulator or fluid pressure reservoir 77b of well known construction and the purpose of which will later be pointed out. The branch conduit 77a is provided with a one-way check valve 77c of known construction and which allows pressure fluid to flow from conduit 77 through branch conduit 77a to the reservoir 77b to accumulate therein and store up fluid pressure at all times when conduit 77 is subject to fluid pressure.

A conduit 90a is connected to the branch conduit 77a intermediate the check valve 77c and the accumulator 77b. The conduit 90a extends to and communicates with a port 90b formed in the selector valve housing 84 in a different plane than the port 88. The selector valve housing 84 is also provided with a port 90 located in the same plane as the port 90b but in a different plane from the ports 88, 89 and 91.

The selector valve body or core 85 is provided with a passage 90c extending therethrough and located in a different plane than the passage 86 but in the same plane as the ports 90 and 90b.

The selector valve body or core 85 can be rocked to a third position, i. e., position B, which is shown as intermediate previously described positions A and C, to place the passage 90c in communication with ports 90 and 90b (see Fig. 1a). It will be noted that in positions A and C the passage 90c is dead-ended while in position B the passage 86 is dead-ended.

The port 90 communicates with conduit 45 that extends to the cylinder 41 of the brake mechanism that locks the stepped brake wheel 32 against rotation.

The setting of the selector valve in the three positions A, B and C enables forward automatic drive, positive low gear drive and reverse drive, respectively, to be selected. When the transmission is installed in a vehicle and the latter is parked and the engine is not running the selector valve may be set in position B to lock the transmission in gear as will later be explained, it being understood that at such time the fluid pressure required is derived from the accumulator 77b.

The selector valve body may also be rocked to a fourth position, i. e., position D, wherein the passages 86 and 90c are dead-ended, this position being the neutral position (see Fig. 1c). The valve body 85 is provided with a spring point 92 that cooperates with four arcuately spaced notches in the inner circumference of the valve housing 84 to hold the valve body in any one of its four selected or rocked positions.

The valve body 85 externally of the valve housing 84 has fixed thereto a radially extending plate 93 which is provided near its outer end with an arcuate slot 94. The upper end of the rod 72 that controls the position of the collar 65 that actuates the pin 59 mounts a roller which is located in the slot 94 and the length of said slot 94 is such that when the valve body 85 is in position A the roller will be in the upper end of the slot (see Fig. 1). When the valve body 85 is in position B (see Fig. 1a) the roller will still be in the slot 94 adjacent its lower end and hence no movement is imparted to the rod 72 for selected positions A and B of the selector valve and therefore in positions A and B the collar 65 and locking pin 59 will be in the position shown in Fig. 2 with the pin withdrawn from the groove 60 in the shaft 10. However, as the selector valve is rocked from position B to positions C and D the roller is in engagement with the lower end of the slot 94 and the rod 72 will be raised upwardly (see Figs. 1b and 1c) to rock the sleeve 68 and shift the collar 65 toward the right as viewed in Fig. 2 to insert the pin 59 in the groove 60 of the engine shaft 10. It will be understood that when the selector valve body or core 85 is rocked in the opposite direction and has passed position C then the spring 63 functions to retract the locking pin and to shift the collar 65 toward the left with a resultant rocking of the sleeve 68 to move the rod 72 downwardly until the collar 65 is at the limit of its left hand movement after which the roller will have relative movement in the slot 94 until in position A of the selector valve it will be adjacent the upper end of the slot.

When the engine is idling the body 78 of the "off" and "on" valve interrupts the flow of fluid pressure to the selector valve. Preferably at this time the selector valve is in position D and the pin 59 automatically is inserted in the groove 60 to lock the sleeve 49 and fan 52 against axial displacement, the spring 54 having acted to axially move the fan to a position wherein the gap between the impeller fan 52 and the driven fan 47 is maximum and therefore minimum fluid torque is developed between the two fans. Inasmuch as no fluid pressure is acting on any of the brake mechanisms at this time (assuming that the selector valve is in position D) all of the brakes are released. At this time the gear 23 keyed to the driven or propeller shaft 11 is held stationary under load and the slow idle rotation (counter-clockwise looking from the left of Figs. 1 and 2) of the driving or engine shaft 10 in combination with the action of the planetary gearing and the minimum torque developed between the fans 52 and 47 causes the fan 47 to rotate at a substantially reduced rate compared with the rate of the idling engine shaft and in the opposite direction. Under these conditions substantially no torque is transmitted through the transmission.

It will now be assumed that it is desired to go into forward automatic drive and that the engine is idling. The operator moves the selector valve to position A and such movement thereof automatically retracts or releases the locking pin 59 with respect to the groove 60, wherefore the sleeve 49 and fan 52 are free to have axial movement on the shaft 10. The operator accelerates the engine by depressing the accelerator pedal and this operates the "on" and "off" valve to place conduits 75 and 77 into communication, wherefore fluid pressure is on the selector valve. The acceleration of the engine thus functions in a manner comparable to the usual clutch. The selector valve having been moved to position A the piston 42 in cylinder 40 of the intermediate brake mechanism is moved as the engine accelerates to apply the brake to the annulus 33 of the free wheeling device and thus to prevent the driven fan 47 from rotating in a direction opposite to the direction of rotation of the engine shaft 10. Consequently gear 25 momentarily during starting is locked to the transmission housing. Hence during the maintenance of this condition a positive mechanical stepped up gear drive between the engine shaft and the driven shaft or propeller shaft is established through the planetary gear unit to effectively overcome the inertia of starting the forward driven movement of the then stationary driven shaft and, in turn, the parts that are driven therefrom.

As the engine is accelerated to accelerate the rotation of the engine shaft 10 and impeller fan 52 the latter is subject to increased negative torque due to the momentary stationary condition of the driven fan 47. As soon as this negative torque becomes sufficiently great to overcome the action of the spring 54 the impeller fan 52 will have a relative reverse rotation on the engine shaft 10 and due to the threads 50 and grooves 51 the sleeve 49 and fan 52 will move axially relative to the engine shaft 10 (which is rotating counterclockwise as viewed from the left of Figs. 1 and 2) to decrease the gap between the impeller fan and the driven fan 47. This decrease in the gap between the fans increases the torque transmitted therebetween and as soon as this torque becomes greater than the negative torque locking the driven fan 47 to the transmission casing, said fan and the sun gear 25 will begin to rotate in the same direction as the engine shaft. Immediately this occurs the balls 35 of the free wheeling device move into the deep portions of the recesses 34 and sleeve 24 and brake wheel 32 rotate with the driven fan 47 in the same direction as the engine shaft. When this condition obtains every increment of accelerated rotation imparted to the driven fan 47 by the fluid torque, accelerates the sun gear 23 on the propeller shaft and a fractional part of such increment of acceleration passes through the planetary gear unit in casing C. As soon as the torque transmitted between the impeller fan 52 and the driven fan 47 reaches the engine torque, disregarding negligible slippage, the transmission is causing the driven or propeller shaft 11 to rotate substantially in direct drive at substantially the same rate of rotation as the engine shaft.

It will now be assumed that it is desired to utilize the transmission in a vehicle and that the engine shaft 10 nevertheless rotates counter-clockwise as viewed from the left of Figs. 1 and 2 to provide a positive low forward speed gear drive to the propeller shaft such as would be required in pulling heavy loads or in utilizing the engine as a brake on down grades. It will be assumed that the selector valve is already in position A and that the vehicle is running in the automatic forward drive and hence the pin 59 is retracted from the groove 60 in the engine shaft. The operator now moves the selector valve from position A to position B (from position of Fig. 1 to position of Fig. 1a). This cuts off pressure fluid through conduit 44 to cylinder 40 and the brake mechanism is released from the free wheeling annulus 33 and the cylinder 40 drains through conduit 46. The positioning of the selector valve in position B applies pressure fluid to conduit 45 extending to the cylinder 41 and hence the brake is applied to the circumference of the brake wheel 32. It will be understood that with the engine running above idling speed and the selector valve in position B (Fig. 1a) pressure fluid flows from conduit 77 through branch conduit 77a, conduit 90a, port 90b, passage 90c and port 90 to conduit 45. Thus brake wheel 32, sleeve 24, driven fan 47 and gear 25 are locked to the transmission casing and held against rotation with the engine shaft. However, the carrier 17 revolves with the engine shaft causing the gears 21 to roll around the locked sun gear 25 and to revolve on the axes of the shafts 19, thus causing the gears 22 to idly turn the sun gear 27 and the gears 20 to drive the sun gear 23 and driven or propeller shaft 11 with a positive gear reduction drive.

It will now be assumed that it is desired to park the vehicle and to lock the same in gear, so as not to rely on the hand brake to keep the vehicle from drifting. Ordinarily in fluid drive transmissions this cannot be accomplished. However, with the present transmission the operator stops the engine and moves the selector valve to position B (Fig. 1a). The fluid pressure stored in the accumulator 77b during the operation of the vehicle acts through conduits 77a, 90a, port 90b, passage 90c, port 90 and conduit 45 to apply and to maintain applied the brake mechanism to lock brake wheel 32, sleeve 24, driven fan 47 and gear 25 to the transmission casing. Therefore, in order for the vehicle to drift the propeller shaft 11 must rotate and for it to do so, requires rotation of sun gear 23 driving gears 20 and 21, with the latter gears rolling around the circumference of now locked sun gear 25. This would necessitate turning of the carrier 17, engine shaft 10 and fan 52 against engine compression and the resistance of the fluid in casing A. Consequently the vehicle can be parked in gear to prevent drifting, a feature which is novel in fluid drive transmissions.

It will now be assumed that it is desired to impart a reverse drive through the transmission. Assuming that the vehicle is stationary or substantially stationary and that the engine is turning over at substantially idle speed, it will be understood from the previous description that the impeller fan 52 and sleeve 49 have moved axially under the action of the spring 54 toward the left from the position shown in Fig. 2, at which time the maximum gap exists between the fans 52 and 47 and the lock pin 59 is aligned with the groove 60 in the engine shaft. At this time no pressure fluid is flowing through the selector valve since the accelerator pedal is not depressed. The operator now moves the selector valve to position C (Fig. 1b) causing lock pin 59 to be inserted in groove 60, and depresses the accelerator to open the "on" and "off" valve and to accelerate the engine. As the acceleration occurs fluid pressure created by the action of the fans flows through conduit 75, the "on" and "off" valve, conduit 77 and through the selector valve to conduit 43, from whence it flows to cylinder 39 to apply the brake mechanism to the brake disk 28 to lock said disk, sleeve 26 and sun gear 27 to the transmission casing. The engine shaft is now revolving the carrier 17 and the gears 22 are rolling around the circumference of the locked sun gear 27 and are turning on the axes of the shafts 19. Also at this time, since the impeller fan 52 is locked against axial displacement in the position of maximum gap between it and the driven fan 47, no effective driving torque is being imparted to the driven fan and to the sun gear 25 so that in effect the revolving movement of the carrier 17 merely causes the gears 21 to roll around the sun gear 25 and turn on their axes. This of course causes a rotation of the gears 20 on the shafts 19 to drive the driven sun gear 23 and the driven or propeller shaft 11 with a gear reduction and in the opposite direction to the direction of rotation of the engine shaft.

The drive through the transmission from the engine shaft to the driven or propeller shaft may be interrupted in either one of two ways. The operator may relieve the accelerator pedal of pressure, whereupon the engine idles and at the same time the "on" and "off" valve between the conduits 75 and 77 automatically moves to "off" position, thus cutting off fluid pressure to the selector valve from conduit 77 so that the brake mechanisms correlated to positions A and C are released irrespective of the position of the selector valve while the brake mechanism correlated to position B is released if the selector valve is not in position B. When all the brake mechanisms are released and the engine is idling, the carrier 17 turns with the slowly rotating engine shaft while the gears 20, 21 and 22 idly rotate on their axes around the circumferences of the sun gears 23, 25 and 27 and no effective driving torque is imparted to the driven shaft 11. At this time the slowly rotating impeller fan 52 imparts negligible torque to fan 47. On the other hand the operator may desire to interrupt the drive through the transmission while operating the engine at higher than idle speed as, for instance, when racing the engine for some purpose. Of course when the engine is operating at higher than idle speed, i. e., when the accelerator is depressed, the main "on" and "off" valve will be open and pressure fluid will be on the selector valve. Consequently under such condition in order to interrupt the drive through the transmission it is necessary that all of the brake mechanisms be released and therefore the operator must move the selector valve to position D, i. e., neutral position, wherein the passages 86 and 90c through the valve body are dead-ended (Fig. 1c) and the conduits 43, 44 and 45 are also dead-ended and no pressure fluid can flow to the brake mechanisms. It will be recalled that when the selector valve is in position D the pin 59 automatically is engaged in the groove 60 of the engine shaft to lock the impeller fan in a position providing the maximum gap between it and the driven fan so that minimum driving torque is imparted to the latter.

From the foregoing it will have been observed that the transmission is controlled through the medium of the accelerator pedal or lever and the lever operating the selector valve to its various positions and thus the operator can readily and easily govern the operation of the vehicle or other mechanism and the obtainance of the automatic forward drive, the positive low gear drive, the reverse drive, or can interrupt the drive from the engine shaft to the propeller shaft through the transmission. The acceleration of the engine also functions similarly to the engagement of the clutch in the usual change speed gear transmission. Likewise the vehicle may be locked in gear for parking purposes, an unusual feature in this type of transmission.

It will have been observed that the planetary gear unit constitutes an epicyclic gear train and it will be understood that various gear ratios may be provided in this train as desired and in addition that the type of gear illustrated may be changed to bevel, internal or other types as desired. Likewise, the invention is not restricted to employing the particular type of impeller and driven fans disclosed herein as any suitable type might be used for the indicated purpose. Furthermore, it is not intended to restrict the invention to the use of brake mechanisms of the contracting type since other types of brake mechanisms may be employed as for instance a disk type mechanism. Likewise, different forms of free wheeling units could be utilized in place of the free wheeling unit disclosed as, for instance, a unit of the roller bearing type or of the pawl type or of any other suitable type.

It has been pointed out briefly and explicitly herein that the transmission embodying the invention is susceptible of use in various environments and wherever it is desired to transmit power from a driving shaft to a driven shaft and to provide speed changes and gear reductions in the transmission of such power. The transmission as illustrated herein contemplates counterclockwise rotation of the driving shaft as viewed from the left of Figs. 1 and 2. However, it is apparent that should the driving shaft 10 be one that rotates clockwise, as viewed from the left of Figs. 1 and 2, that then the transmission will function with equal efficiency and there will be only the necessity of suitably changing certain of the parts thereof as, for instance, the pitch of the threads 50 and of the grooves or threads 51 as well as the reversal of the disposition of the recesses 34 in the inner circumference of the brake annulus 33.

Inasmuch as the transmission has particular utility when installed in a motor vehicle such use of the transmission has been referred to herein, not withstanding that the transmission is illustrated for counterclockwise rotation of the drive or power shaft 10 when viewed from the left of Figs. 1 and 2, even though in most motor vehicles it is conventional practice to have the engine shaft rotating clockwise as viewed from the front of the vehicle.

Although a preferred embodiment of the invention has been illustrated and described herein it will be understood that the invention is susceptible of various modifications and adaptations within the scope of the appended claims.

Having thus described my invention, I claim:

1. In a transmission comprising a fixed housing including a sealed casing adapted to be filled with a suitable liquid, driving and driven shafts extending into said housing and rotatably supported thereby, driving and driven fans in said casing arranged with a gap therebetween and coaxial with said shafts, a mechanical power train in said housing and including elements one of which is fixed to said driving shaft and another to said driven shaft, and means mounting said driving and driven fans and operatively interconnecting the same respectively with said driving shaft and a further element of said train and providing for relative axial movement between said fans automatically in response to operative conditions to vary the fan gap and thus the fluid torque transmitted between the driving and driven fans.

2. In a transmission comprising a fixed housing including a sealed casing adapted to be filled with a suitable liquid, driving and driven shafts extending into said housing and rotatably supported thereby, driving and driven fans in said casing arranged with a gap therebetween and coaxial with said shafts, a mechanical power train in said housing and including elements one of which is fixed to said driving shaft and another to said driven shaft, means rotatably mounting said driven fan in fixed axial position and operatively interconnecting the same with a further element of said train, and means rotatably mounting said driving fan and operatively interconnecting the same with said driving shaft for rotation therewith and axial displacement relative thereto automatically in response to operative conditions to vary the fan gap and thus the fluid torque transmitted between the driving and driven fans.

3. In a transmission comprising a fixed housing including a sealed casing adapted to be filled with a suitable liquid, driving and driven shafts extending into said housing and rotatably supported thereby, driving and driven fans in said casing arranged with a gap therebetween and coaxial with said shafts, a mechanical power train in said housing and including elements one of which is fixed to said driving shaft and another to said driven shaft, means rotatably mounting said driven fan in fixed axial position and operatively interconnecting the same with a further element of said train, a sleeve freely rotatable and slidable on said driving shaft and mounting said driving fan, spring means acting on said sleeve tending to slide the same in one direction relative to said driving shaft, said driving shaft and said sleeve being provided with cooperating threads rotatably interconnecting the shaft and sleeve but providing for relative axial movement therebetween automatically in response to operative conditions to vary the fan gap and thus the fluid torque transmitted between the driving and driven fans.

4. A transmission as defined in claim 3 and wherein said driving shaft and said sleeve are provided with cooperating means selectively engageable for locking the sleeve against relative axial displacement with respect to the driving shaft when positioned to provide maximum fan gap between the driving and driven fans.

5. In a transmission comprising a fixed housing including a sealed casing adapted to be filled with a suitable liquid, driving and driven shafts extending into said housing and rotatably supported thereby, driving and driven fans in said casing arranged with a gap therebetween and coaxial with said shafts, a planetary gear unit in said housing and including elements one of which is fixed to said driving shaft and another to said driven shaft, and means mounting said driving and driven fans and operatively interconnecting the same respectively with said driving shaft and a further element of said planetary gear unit and providing for relative axial movement between said fans automatically in response to operative conditions to vary the fan gap and thus the fluid torque transmitted between the driving and driven fans.

6. A transmission as defined in claim 5 and wherein the planetary gear unit is of the sun and carrier type.

7. A transmission as defined in claim 5 and wherein there is provided means for selectively locking against rotation certain of the elements of the planetary gear unit; said last named means including pressure fluid actuated braking mechanisms, and a fluid pressure circuit between said mechanisms and said casing and including a selector valve.

8. In a transmission comprising a fixed housing including a sealed casing adapted to be filled with a suitable liquid, driving and driven shafts extending into said housing and rotatably supported thereby, driving and driven fans in said casing arranged with a gap therebetween and coaxial with said shafts; a gear train in said housing and including elements one of which is fixed to said driving shaft and another to said driven shaft; means mounting said driving and driven fans and operatively interconnecting the same respectively with said driving shaft and a further element of said train and providing for relative axial movement between said fans automatically in response to operative conditions to vary the fan gap and thus the fluid torque transmitted between the driving and driven fans; spring means tending to axially move said fans relatively to a position of maximum gap, means for selectively locking against rotation certain of the elements of said gear train to obtain different driving results through the transmission; said last named means including pressure fluid actuated braking mechanisms and a fluid pressure circuit between said mechanisms and said casing and having therein a selector valve; locking means for maintaining said fans against relative axial movement from a position of maximum fan gap, and mechanical operative connections between said locking means and said selector valve for automatically actuating said locking means when said selector valve is in a predetermined position.

9. A transmission as defined in claim 8 and wherein the means mounting said driving and driven fans includes means rotatably mounting said driven fan in fixed axial position and operatively interconnecting the same with a further element of said train, and means rotatably mounting said driving fan and operatively interconnecting the same with said driving shaft for rotation therewith and axial displacement relative thereto; said locking means being operatively associated with said driving fan and said driving shaft.

10. A transmission as defined in claim 8 and wherein the means for mounting said driving and driven fans includes means rotatably mounting said driven fan in fixed axial position and operatively interconnecting the same with a further element of said train and means for mounting said driving fan and including a sleeve freely rotatable and slidable on said driving shaft; said driving shaft and said sleeve being provided with cooperating threads rotatably interconnecting the shaft and sleeve but providing for relative axial movement therebetween; said locking means including cooperating pin and groove elements carried by said sleeve and driving shaft.

11. In a transmission comprising a fixed housing including a sealed casing adapted to be filled with a suitable liquid, driving and driven shafts extending into said housing and rotatably supported thereby, driving and driven fans in said casing and coaxial with said shafts; a planetary gear unit in said housing and including a plurality of sun gears, a carrier and gears carried by said carrier and meshing with said sun gears, one of said sun gears being fixed to said driven shaft, said carrier being fixed to said driving shaft; means mounting said driving fan for rotation with said driving shaft, means mounting said driven fan for rotation relative to said driving shaft and operatively interconnecting said driven fan with another of said sun gears; a brake wheel in said housing fixed to said last named means; a free wheeling device operatively associated with said brake wheel and including an annulus which when held against rotation prevents rotation of said brake wheel and driven fan in a direction opposite to the direction of rotation of said driving shaft; a brake disk in said housing and rotatable relative to said brake wheel and said driving shaft and operatively connected to another of said sun gears; separate brake mechanisms operatively associated with said brake wheel, said annulus and said brake disk and acting when applied to hold said wheel, annulus and disk respectively against rotation to effect respectively by the transmission a positive low gear drive of the driven shaft or a forward automatic drive thereof or a reverse drive thereof; pressure fluid actuated devices for said brake mechanisms, a fluid pressure circuit between said devices and said casing and including a supply circuit extending from said casing, a selector valve for selectively actuating any one or none of said devices to selectively apply any one or none of said brake mechanisms and connected to said supply circuit, and separate conduits extending from said valve to each of said devices.

12. A transmission as defined in claim 11 and wherein said supply circuit includes an on and off valve adapted to be operatively interconnected with the accelerator for the power source for the driving shaft so as to be off or closed when said power source is idling and on or opened upon acceleration of said power source.

13. A transmission as defined in claim 11 and wherein said supply circuit includes a conduit connected to said selector valve, a branch conduit from said first conduit and connected to said selector valve independently of said first conduit and including therein a check valve allowing pressure fluid to flow only from said first conduit through said branch conduit, and an accumulator in communication with said branch conduit, said selector valve being provided with means for placing said first conduit selectively in communication with the separate conduits extending to the devices for actuating the braking mechanisms associated with the free wheeling annulus and the brake disk, said selector valve being provided with independent means for placing said branch conduit and said accumulator in communication with said separate conduit to the device for actuating the brake mechanism associated with the brake wheel, whereby when the driving shaft is stopped said selector valve may be positioned to effect braking of the brake wheel by the fluid pressure in the accumulator and the transmission can be locked in positive low gear.

14. A transmission comprising, in combination, a housing including a sealed casing adapted to be filled with a suitable liquid, driving and driven shafts extending into said housing and rotatably supported thereby; a fluid drive unit in said casing and including an impeller fan operatively connected with said driving shaft and a driven fan; a planetary gear unit in said housing operatively connecting said shafts and operatively connecting said driven fan of said fluid drive unit with said driven shaft, separate brake mechanisms operatively associated with said planetary gear unit for braking certain elements of said gear unit against rotation to provide for forward automatic drive through said transmission, for positive low gear drive therethrough or for reverse drive therethrough; pressure fluid actuating devices operatively associated with said braking mechanisms, fluid circuits from said casing to said devices, the fluid circuit extending to the device that operates the brake mechanism for obtaining positive low gear drive including an accumulator, and control means operatively associated with said circuits for selectively applying the brake mechanisms to obtain forward automatic drive, reverse drive, positive low gear drive, or to lock the transmission in positive low gear by the fluid pressure in the accumulator when the driving shaft is stopped.

EDWIN G. REED, Jr.

REFERENCES CITED

The following references are of record in the file of this patent:

UNITED STATES PATENTS

| Number | Name | Date |
|---|---|---|
| 2,158,557 | Lammeren | May 16, 1939 |
| 2,196,660 | Dodge | Apr. 9, 1940 |
| 2,235,370 | Jandasek | Mar. 18, 1941 |
| 2,238,310 | Dodge | Apr. 15, 1941 |
| 2,316,390 | Biermann | Apr. 13, 1943 |
| 2,318,187 | Addison | May 4, 1943 |
| 2,345,752 | Jandasek | Apr. 4, 1944 |
| 2,361,104 | Jandasek | Oct. 24, 1944 |
| 2,364,448 | Jandasek | Dec. 5, 1944 |
| 2,372,817 | Dodge | Apr. 3, 1945 |
| 2,377,009 | Heyer | May 29, 1945 |